(12) United States Patent
Uchiyama

(10) Patent No.: US 7,325,863 B2
(45) Date of Patent: Feb. 5, 2008

(54) HEAT SHIELD PLATE ATTACHMENT STRUCTURE OF HEAT EXCHANGER FOR MOTOR VEHICLE

(75) Inventor: Tatsuhiko Uchiyama, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 371 days.

(21) Appl. No.: 11/176,379

(22) Filed: Jul. 8, 2005

(65) Prior Publication Data

US 2006/0009088 A1     Jan. 12, 2006

(30) Foreign Application Priority Data

Jul. 12, 2004  (JP)  ............... 2004-204999

(51) Int. Cl.
*B62D 25/08*    (2006.01)
(52) U.S. Cl. ................. 296/193.09; 296/39.3
(58) Field of Classification Search ........... 296/193.09, 296/39.3, 29; 24/458, 619
See application file for complete search history.

(56) References Cited

U.S. PATENT DOCUMENTS 3,822,909 A * 7/1974 Livingstone et al. ....... 293/142

| | | | |
|---|---|---|---|
| 4,940,281 A * | 7/1990 | Komatsu | 296/193.09 |
| 5,924,393 A | 7/1999 | Kikuchi | |
| 6,196,624 B1 * | 3/2001 | Bierjon et al. | 296/193.09 |
| 6,932,416 B2 * | 8/2005 | Clauson | 296/146.7 |
| 7,073,848 B2 * | 7/2006 | Lee | 296/193.09 |
| 2002/0047689 A1 | 4/2002 | Bessho et al. | |
| 2007/0138835 A1 * | 6/2007 | Kapadia et al. | 296/193.09 |

FOREIGN PATENT DOCUMENTS

EP    1 388 677 A2   2/2004
JP    2001-253230 A  9/2001

* cited by examiner

*Primary Examiner*—Dennis H. Pedder
*Assistant Examiner*—Mike Hernandez
(74) *Attorney, Agent, or Firm*—Foley & Lardner LLP

(57) ABSTRACT

A heat shield plate attaching portion on a vehicle body has an engaging hole. On an elastic heat shield plate, an engaging projection is formed to elastically engage with the engaging hole. The engaging projection has, from its base side to its tip side, a small diameter axis portion with substantially the same outside diameter as an inside diameter of the hole, a shrinking large diameter engaging portion with a larger diameter than the inside diameter, a pinch portion for pulling with a smaller diameter than the inside diameter, and a hollow portion formed at the axial center of the small diameter axis portion, the hollow portion communicating with the outside atmosphere. The plate is attached to the attaching portion in such a manner that the large diameter engaging portion engages with the opening edge of the hole.

4 Claims, 10 Drawing Sheets

F I G. 8
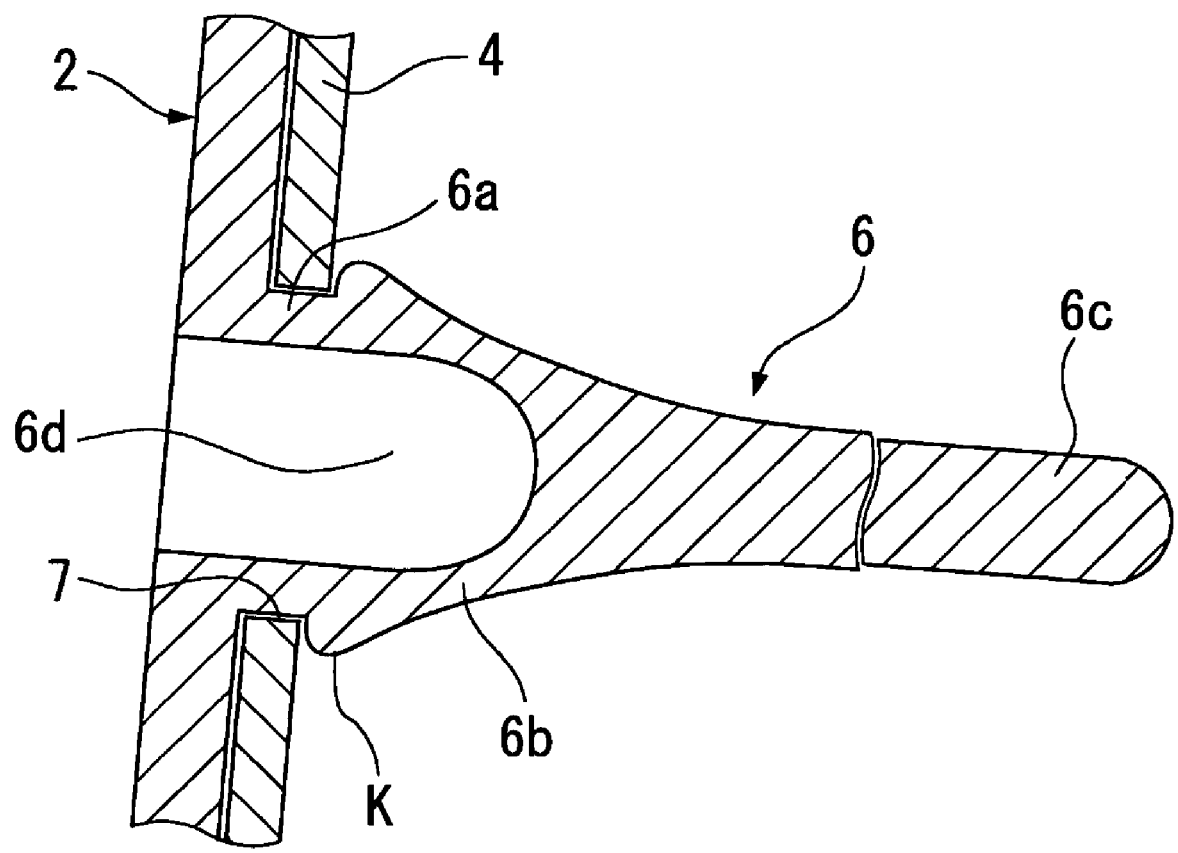

HEAT SHIELD PLATE ATTACHMENT STRUCTURE OF HEAT EXCHANGER FOR MOTOR VEHICLE

BACKGROUND OF THE INVENTION

1. Field of the Invention

The present invention relates to a heat shield plate attachment structure of a heat exchanger, such as a radiator, for a motor vehicle.

2. Description of the Related Art

Conventionally, high temperature air in an engine room flows around to the front of a heat exchanger while engine idling, and accordingly, in the technology disclosed in Japanese Patent Application Laid-open No. 2001-253230, several types of heat shield plates are set on the periphery of the heat exchanger, and they are attached to a radiator core support or the like to thereby insulate the radiator from the heat.

However, in the conventional technology, the heat shield plates, as described above, are attached by clips, bolts, or the like to the radiator core support or the like, which causes problems as follows.

There are problems such that, besides the heat shield plates, fastening parts such as clips, bolts, or the like are needed, which increases the number of parts to increase the cost, and also, a certain work space is necessary for performing fastening with the clips or bolts, which makes it troublesome to set sufficient work space in some motor vehicles, because an engine room is narrow and a position where this work space is difficult to obtain.

An object of the present invention is to provide a heat shield plate attachment structure of a heat exchanger for a motor vehicle in which attachment of a heat shield plate can be easily and quickly performed when there is a small work space without requiring separate fastening parts, which improves the work efficiency and reduces the cost.

SUMMARY OF THE INVENTION

In order to achieve the above described object, a heat shield plate attachment structure of a heat exchanger for a motor vehicle according to the present invention has: a heat shield plate attaching portion that is provided on a vehicle body and has an engaging hole formed thereon; and a heat shield plate made of an elastic material, the heat shield plate having an engaging projection formed of elastic material and thereon so that the engaging projection engages elastically with the engaging hole of the heat shield plate attaching portion, the engaging projection having, from a base side thereof, a small diameter axis portion formed thereon with substantially the same outside diameter as an inside diameter of the engaging hole, a large diameter engaging portion formed in a diameter-shrinking shape having an engaging portion with a larger diameter than the inside diameter of the engaging hole on a tip side of the small diameter axis portion, a pinch portion for pulling formed with a smaller diameter than the inside diameter of the engaging hole on a tip of the large diameter engaging portion, and a hollow portion formed at the axial center of the small diameter axis portion and the large diameter engaging portion, the hollow portion communicating with the outside atmosphere, wherein the heat shield plate is attached to the heat shield plate attaching portion in such a manner that the pinch portion is inserted into the engaging hole and pinched and pulled from the opposite side thereof to pass the large diameter engaging portion through the engaging hole so that the large diameter engaging portion engages with the opening edge of the engaging hole.

Therefore, in the heat shield plate attachment structure of the heat exchanger for the motor vehicle, attachment of the heat shield plate can be easily and quickly performed even in a small work space, which improves the work efficiency.

Further, since it does not need fastening parts of separate body such as clips, bolts, or the like, so that the cost can be reduced.

Further, by forming the hollow portion communicating with the outside atmosphere at the axial center of the small diameter axis portion and the large diameter engaging portion of the engaging projection, passing of the large diameter engaging portion through the engaging hole becomes easy, and at the same time, engaging strength thereof can be improved.

Preferably, the hollow portion opens on a surface opposite to the projecting direction of the engaging projection on the heat shield plate so that the hollow portion communicates with the outside atmosphere.

Therefore, the engaging projection can be integrally formed easily with using a simpler mold, and easily inserted into the engaging hole to pass through it, because the engaging portion can be easily deformed so as to reduce its diameter due to the presence of the above-formed hollow portion.

Preferably, the heat shield plate and the engaging projection are integrally formed of the elastic material with each other.

Therefore, the heat shield plate and the engaging projection can be easily formed with low cost.

BRIEF DESCRIPTION OF THE DRAWINGS

The objects, features and advantages of the present invention will become apparent as the description proceeds when taken in conjunction with the accompanying drawings, in which:

FIG. 8 is an enlarged cross-sectional view taken along the A-A line in FIG. 7;

FIG. 9A and FIG. 9B are perspective views showing attaching method of the heat shield plate, illustrating states of the heat shield plate and a lower radiator core support member of the radiator core support before and after the heat shield plate is attached to the support member, respectively.

DETAILED DESCRIPTION OF THE PREFERRED EMBODIMENTS

Hereinafter, an embodiment of the present invention will be described based on the drawings.

An attachment structure of a heat shield plate with respect to a heat exchanger for a motor vehicle has a radiator core support 1 and a heat shield plate 2. The radiator core support 1 corresponds to a heat shield plate attaching portion, which is provided on a vehicle body, of the present invention.

Figure 1:
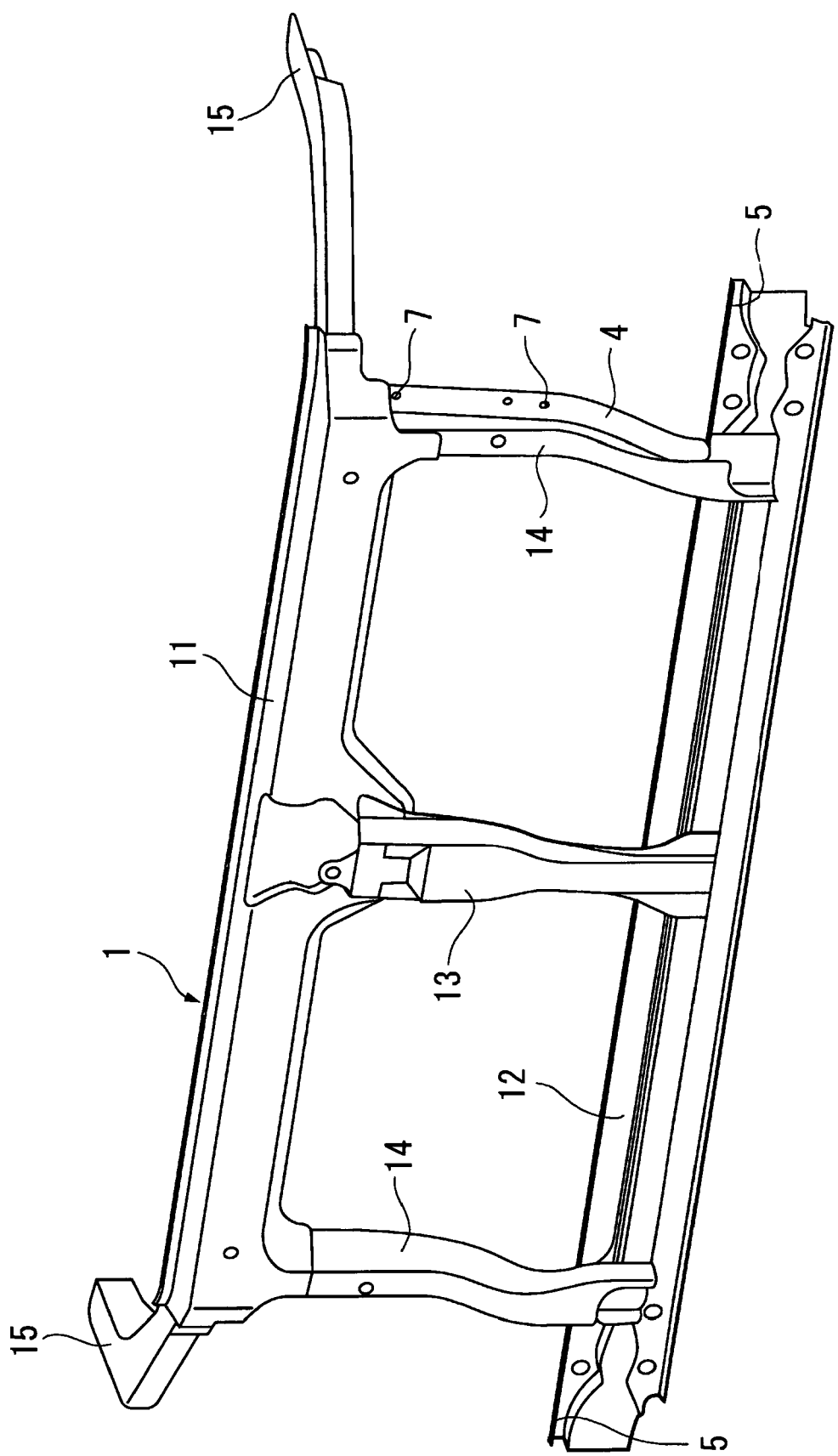
FIG. 1 is a perspective view from a motor vehicle front side showing a radiator core support, before a heat shield plate is attached thereto, of an embodiment according to the present invention.

The radiator core support 1 has, as shown in FIG. 1, an upper radiator core member 11 extending in a motor vehicle width direction, a lower radiator core member 12 arranged in parallel to and below the upper radiator core member 11, a hood lock stay 13 coupling approximately middle portions of the upper radiator core member 11 and the lower radiator core member 12 in the vertical direction, side radiator core members 14 and 14 coupling both end portions of the upper radiator core member 11 and the lower radiator core member 12 in the vertical direction, and core upper side radiator members 15 and 15 extending from the both end portions of the upper radiator core member 11 to the rear side of a motor vehicle, and it is entirely made of metal.

Figure 2:
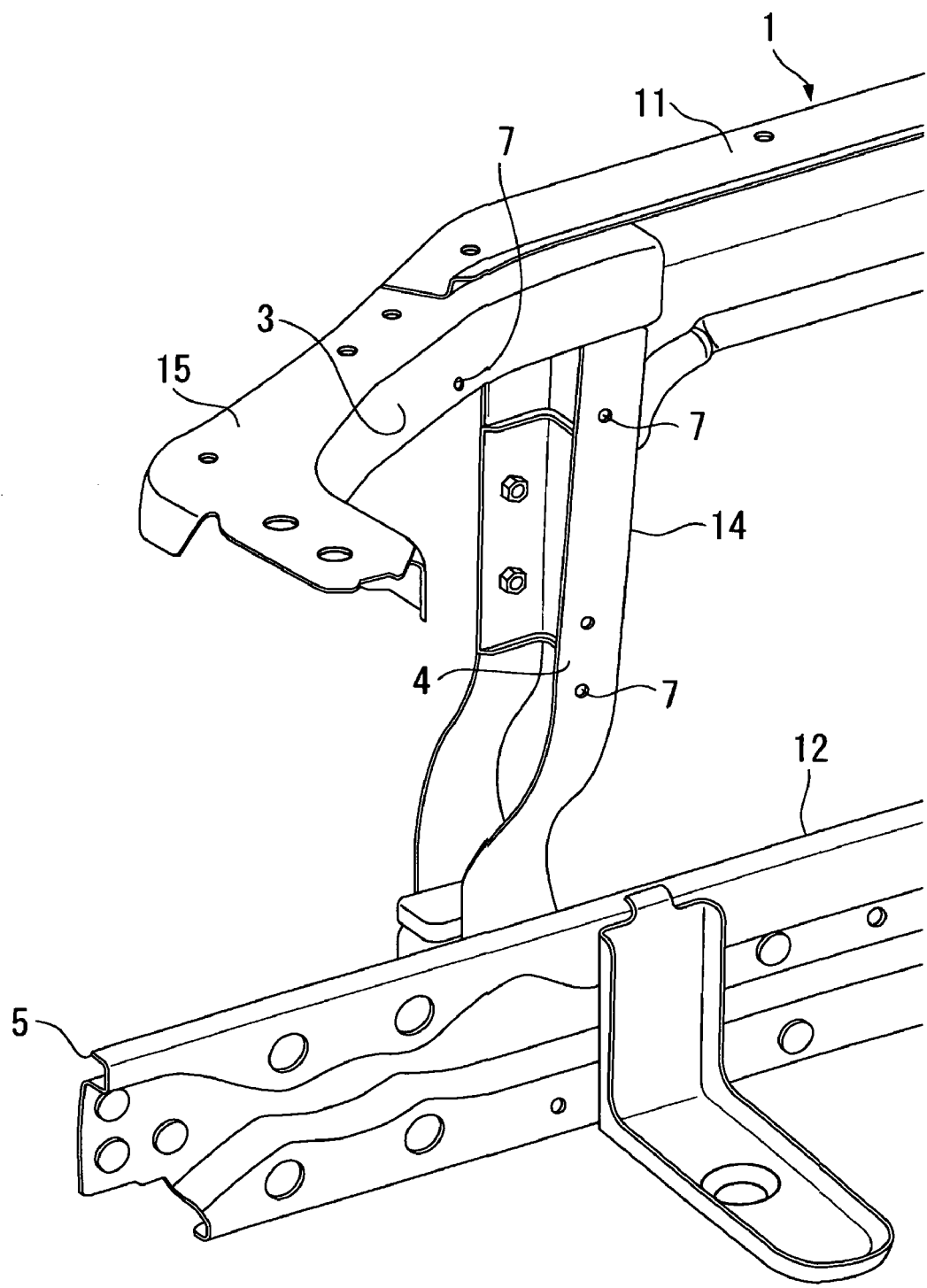
FIG. 2 is a perspective view from a motor vehicle rear side showing a main part of the radiator core support before the heat shield plate is attached thereto.
Figure 4:
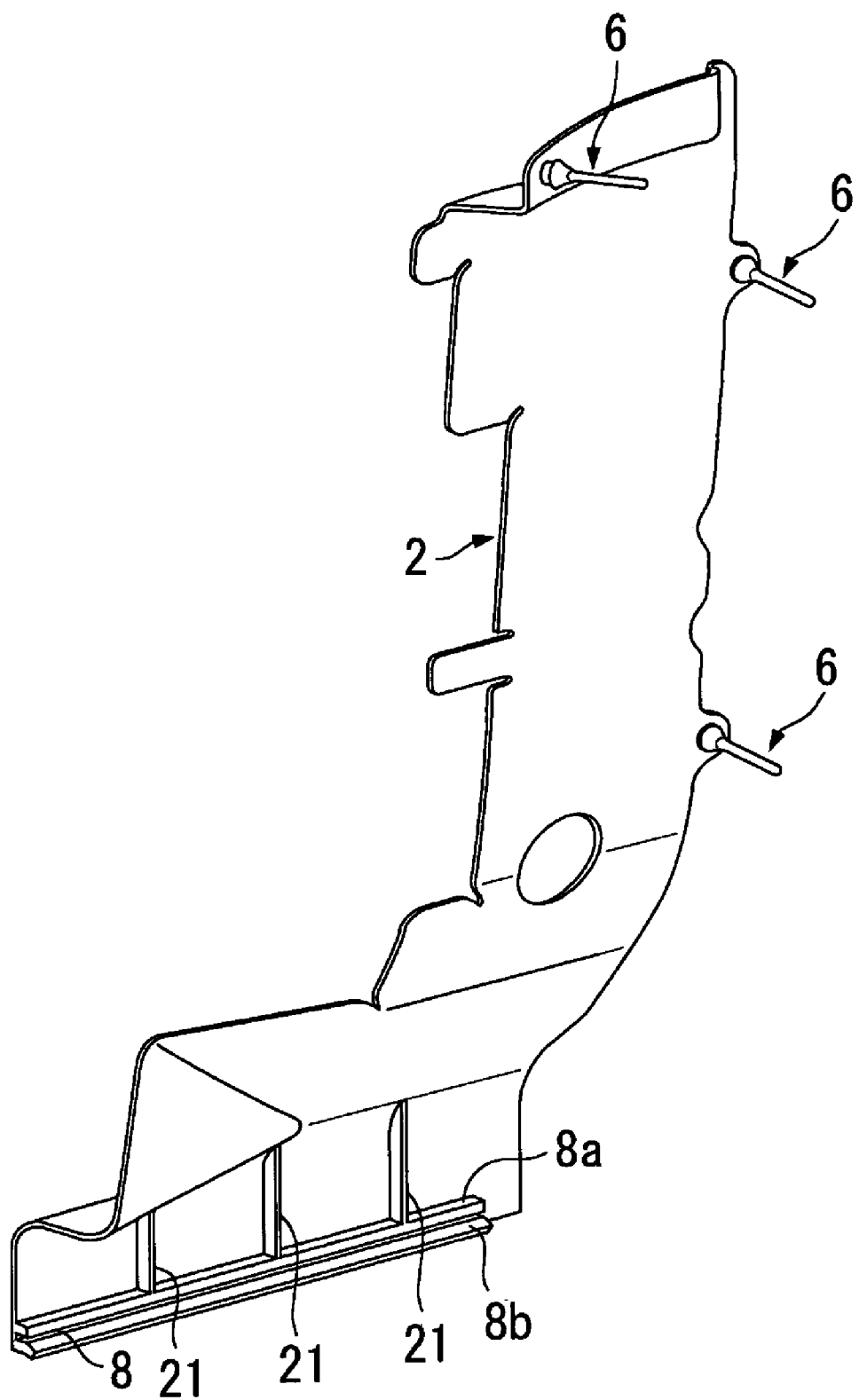
FIG. 4 is a perspective view from the motor vehicle rear side showing the heat shield plate.

As shown in FIG. 4, on lower sides of both the left and right upper side radiator core members 15 and 15 and on the outsides of both the left and right side radiator core members 14 and 14, flange portions 3, 4 for attaching the heat shield plate 2 shown in FIG. 2 are provided respectively.

On the upper edge of the lower radiator core member 12, as shown in FIG. 2, a flange portion 5 is formed to bent forward of the vehicle.

Figure 3A:
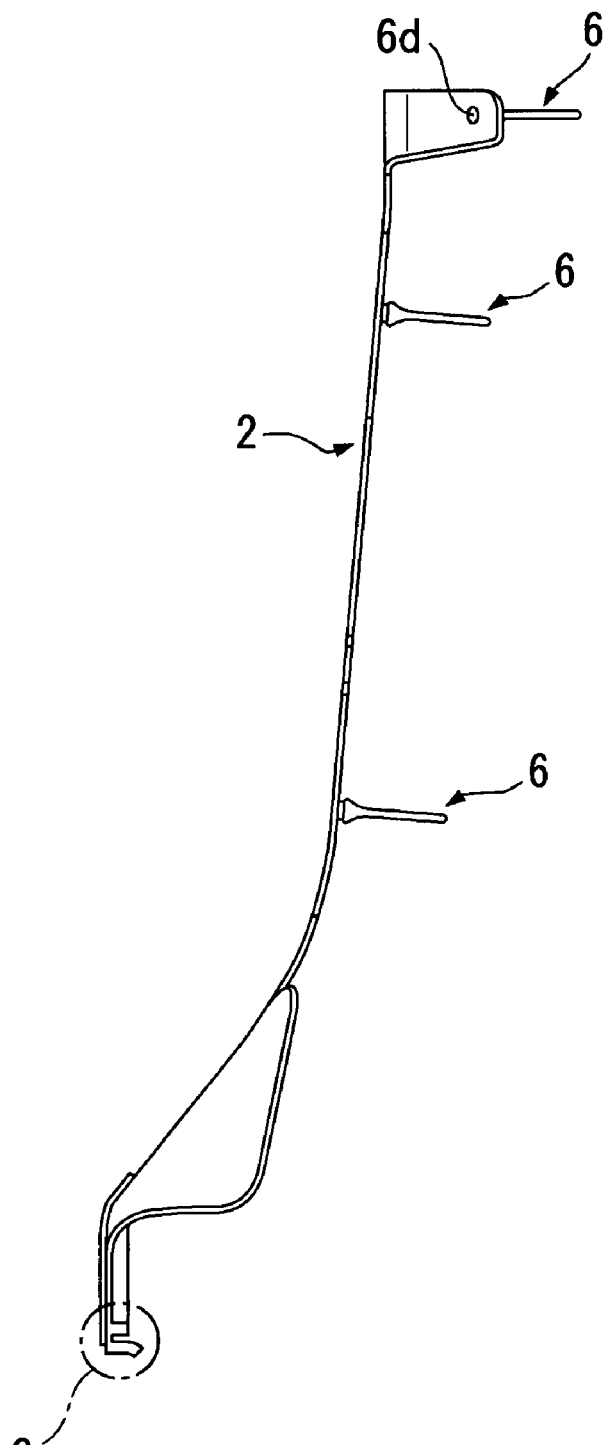
FIG. 3A is a side view showing the heat shield plate.

As shown in FIG. 3A and FIG. 4, the heat shield plate 2 is formed of elastic material such as rubber in a thin plate shape having a size that can cover a space between one of both the left and right upper side radiator core members 15 and 15 and the lower radiator core member 12 outside one of both the left and right side radiator core members 14 and 14, and engaging projections 6 are formed integrally thereon, one at an upper end portion opposing the flange portion 3, and two at inner end portions opposing the flange portion 4, respectively.

On the flange portions 3 and 4 corresponding to the positions of the respective engaging projections 6, engaging holes 7 for engaging the engaging projections 6 are formed as shown in FIG. 1 and FIG. 2.

The engaging projections 6 are each formed to have, from a base side thereof as shown in an enlarged detail cross-sectional view of FIG. 8, a small diameter axis portion 6a formed thereon with substantially the same outside diameter as an inside diameter of the engaging hole 7, a large diameter engaging portion 6b formed in a diameter-shrinking shape, for example a tapered shape, having an engaging portion k with a larger diameter than the inside diameter of the engaging hole 7 on a tip side of the small diameter axis portion 6a, a pinch portion 6c for pulling formed with a smaller diameter than the inside diameter of the engaging hole 7 on a tip of the large diameter engaging portion 6b. At the axial center of the small diameter axis portion 6a and the large diameter engaging portion 6b, a hollow portion 6d is formed, which opens on a surface opposite to the projecting direction of the engaging projections 6 on the heat shield plate 2.

On the lower edge of the heat shield plate 2, as shown in FIG. 3B, FIG. 4, FIG. 9, and FIG. 10, there is formed an engaging trench 8 which can be fitted to and engaged with the flange portion 5, which is formed on the upper edge of the lower radiator core member 12 to bend forward of the vehicle.

Figure 3B:
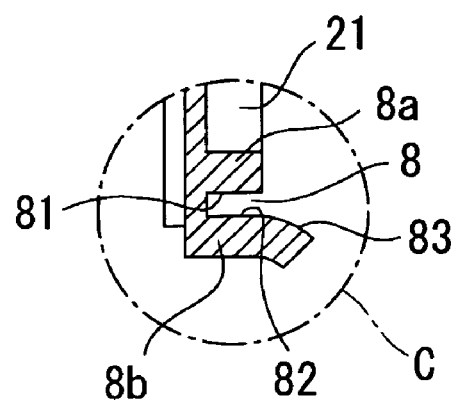
FIG. 3B is an enlarged view of a lower part of the heat shield plate indicated by a dotted circle C of FIG. 3A.

The engaging trench 8 is, as shown in FIG. 3B, constituted of a space between two protruding ridges 8a and 8b formed integrally to protrude on a rear surface, the portion surrounded by a circle C in FIG. 3A, on the lower edge of the heat shield plate 2. The protruding ridge 8b on the lower side is formed higher than the protruding ridge 8a on the upper side so that an inner wall surface 82 on the lower side of the engaging trench 8 is formed longer toward the rear side of the vehicle than an inner wall surface 81 on the upper side thereof, and a taper portion 83 is formed on an opening edge of the inner wall surface on the lower side of the engaging trench 8.

On a vehicle rear side surface above the protruding ridge 8a on the upper side of the heat shield plate 2, three ribs 21 are formed integrally, having the same height as the top surface of the protruding ridge 8a on the upper side and lining upward with each other.

Figure 5:
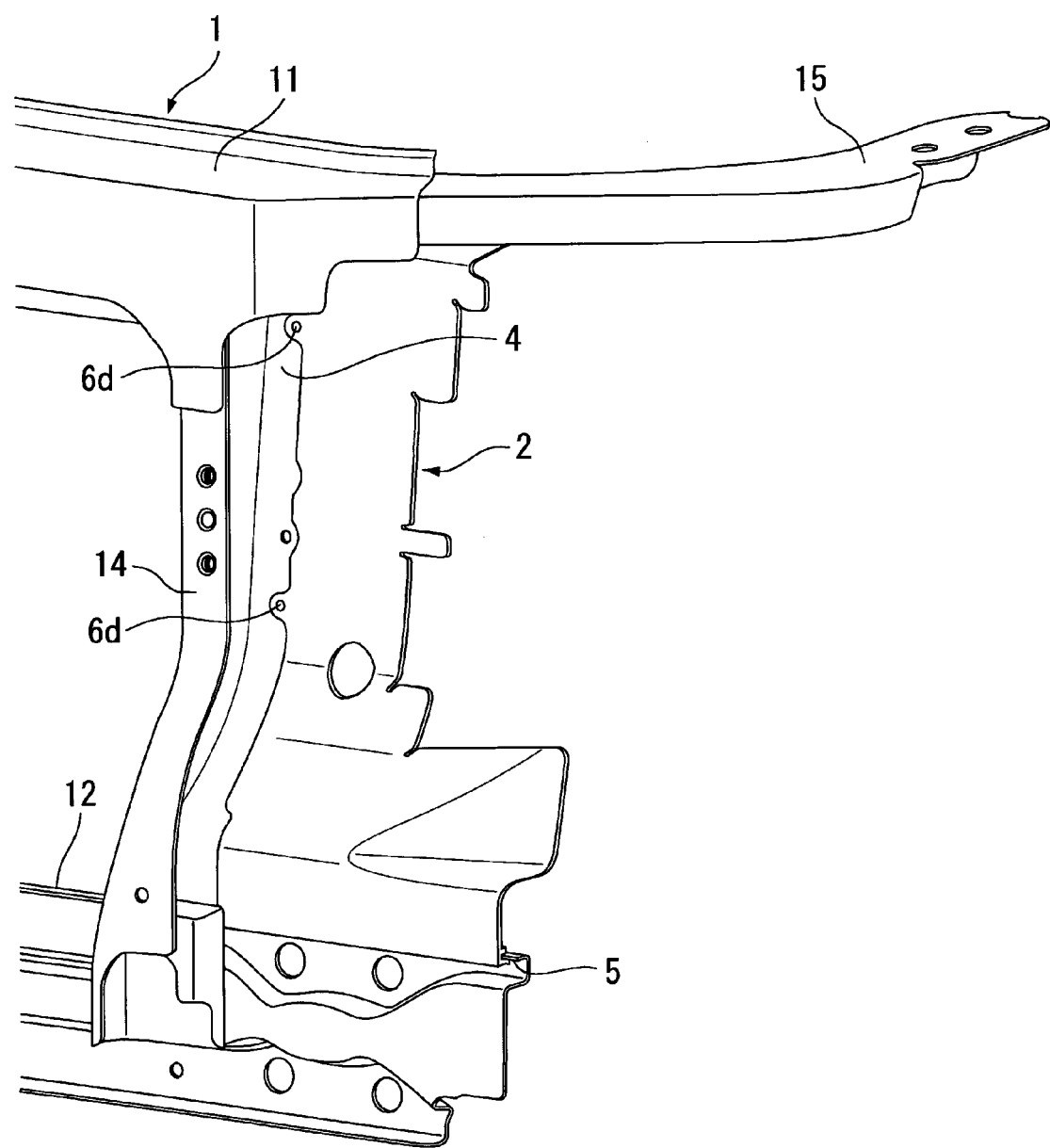
FIG. 5 is a perspective view from the motor vehicle front side showing a main part of an attachment structure of the heat shield plate of a heat exchanger for a vehicle of this embodiment.
Figure 6:
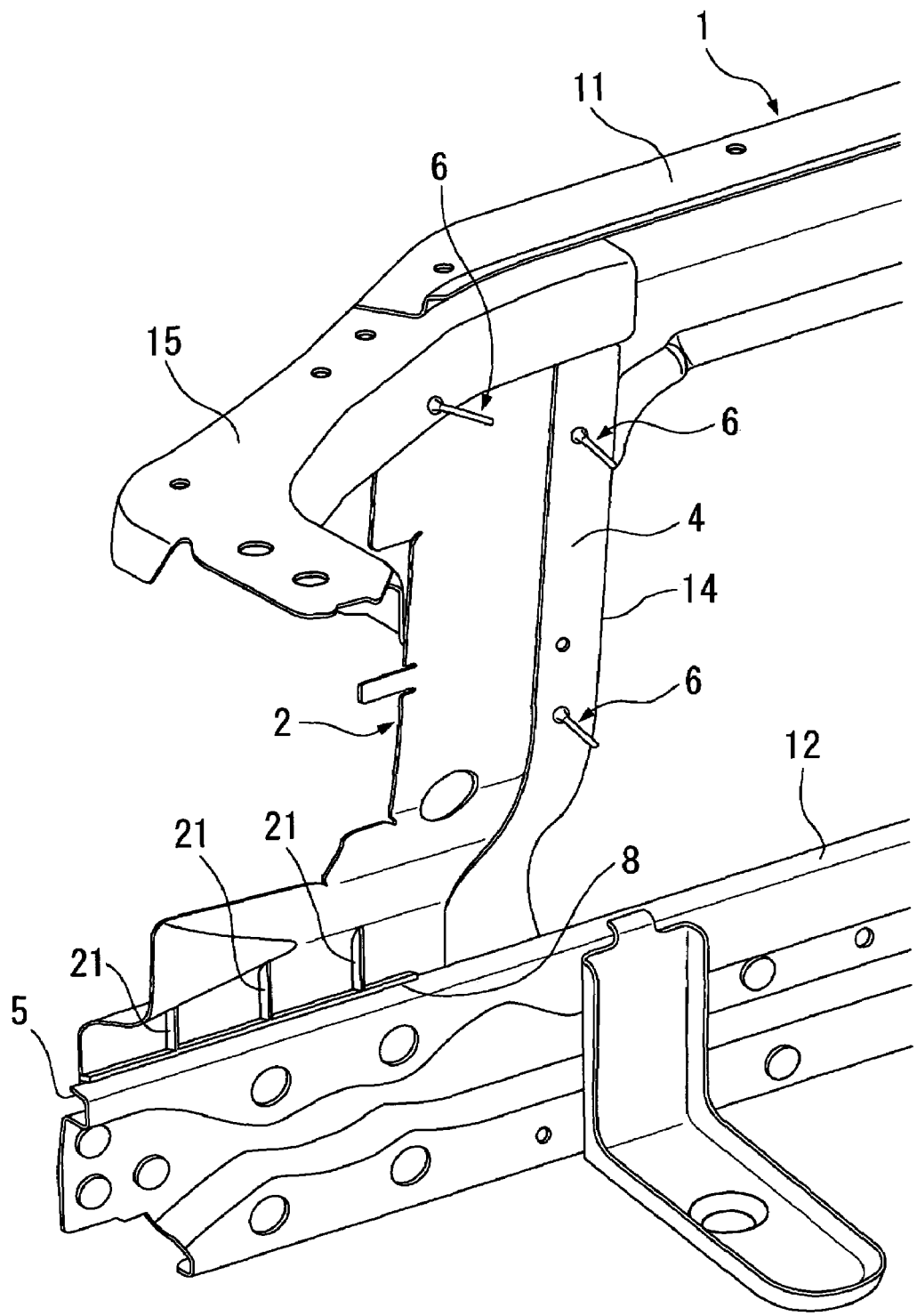
FIG. 6 is a perspective view from the vehicle rear side showing a main part of the attachment structure of the heat shield plate.
Figure 7:
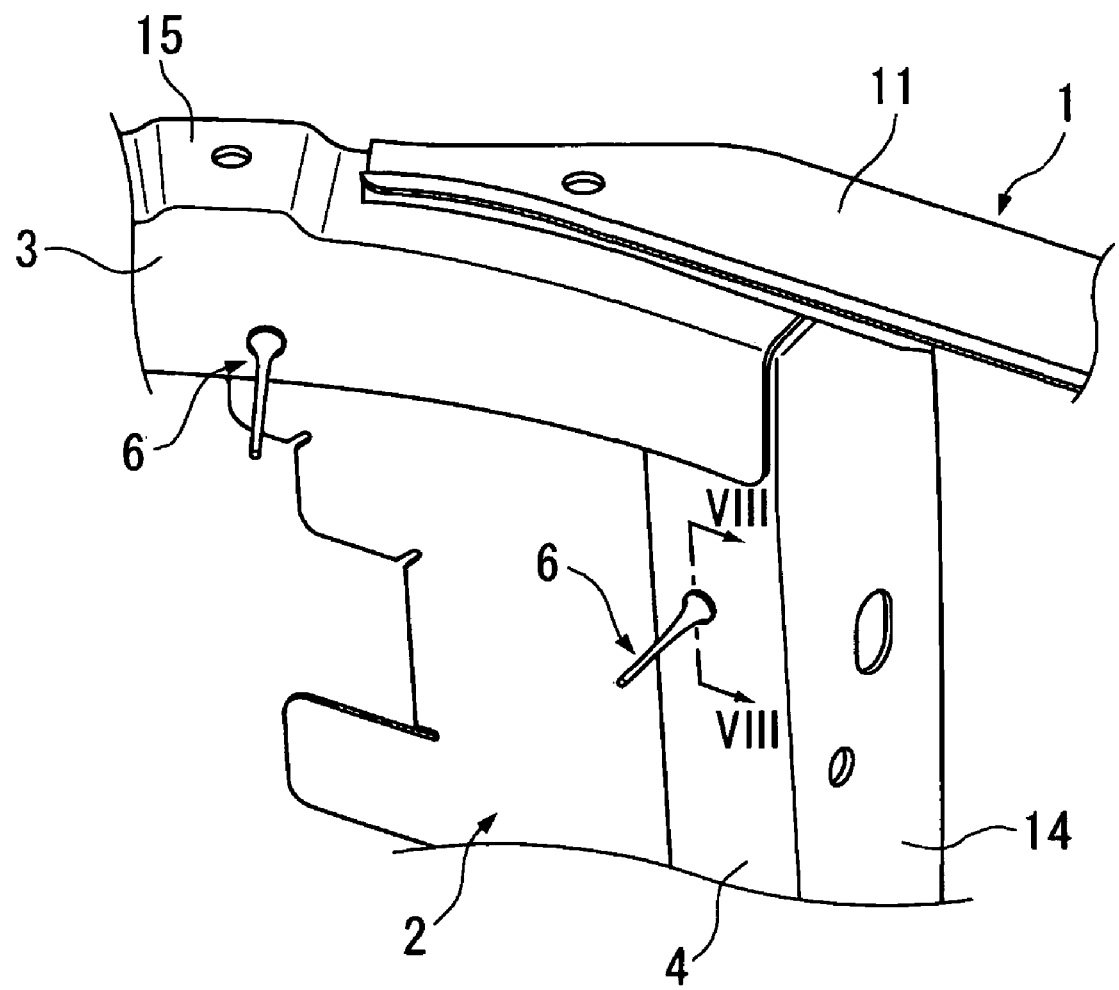
FIG. 7 is an enlarged perspective view from the motor vehicle rear side showing the main part of the attachment structure of the heat shield plate.
Figure 9A:
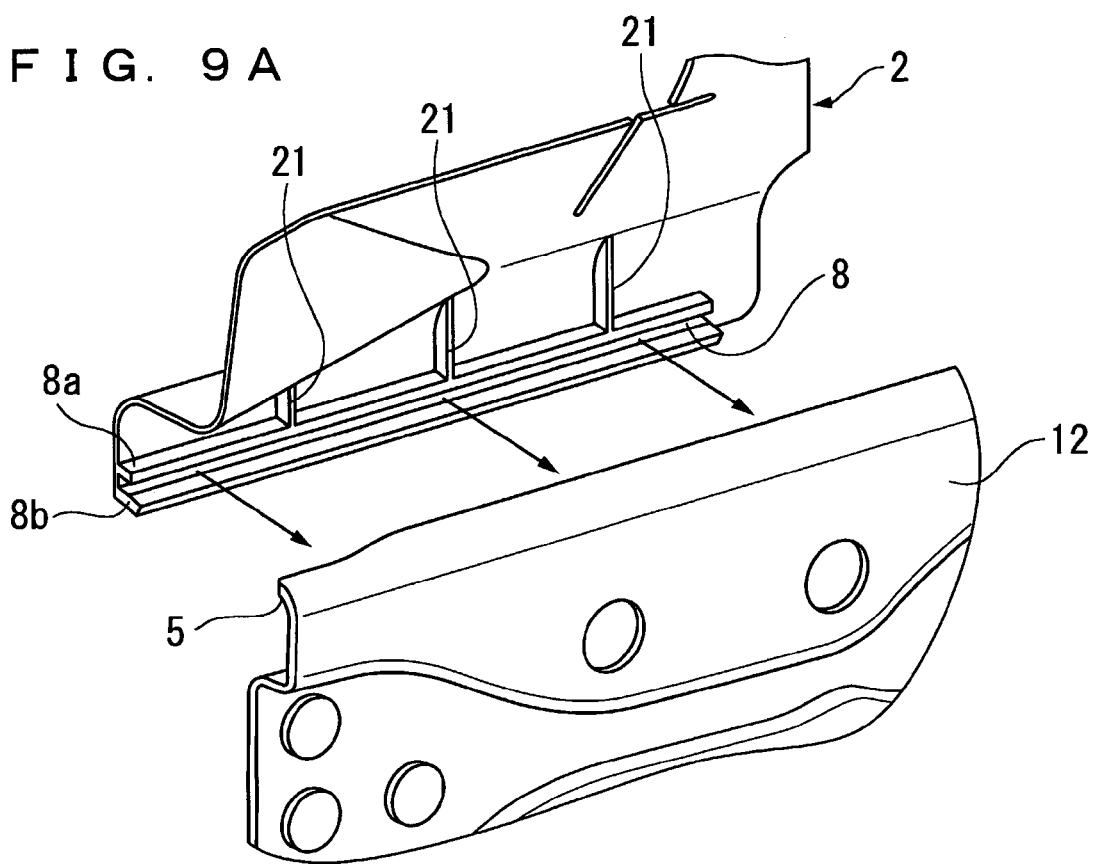
Figure 9A:
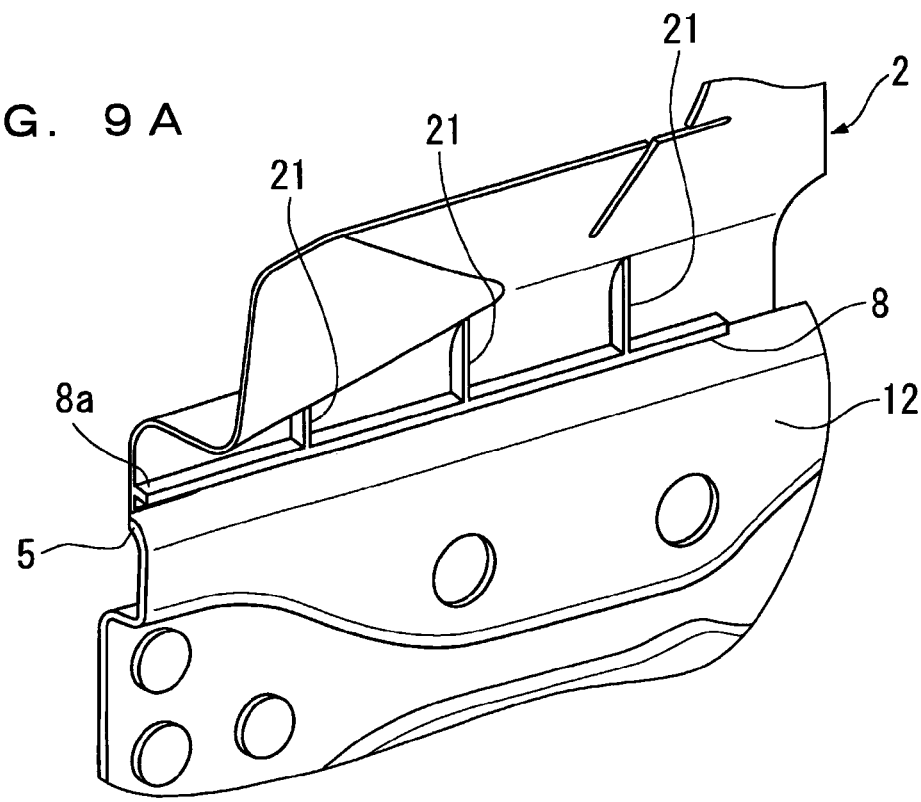

In this embodiment, when attaching the heat shield plate 2 to the lower radiator core member 12, first as shown in FIG. 9A, the engaging trench 8 formed on the lower edge of the heat shield plate 2 is pushed against the flange portion 5, which is formed on the upper edge of the lower radiator core member 12 to bend forward of the vehicle, so that the engaging trench 8 is fitted thereto and engaged therewith as shown in FIG. 9B, thereby creating a state that the lower edge of the heat shield plate 2 is attached to the lower radiator core member 12 as shown in FIG. 5 and FIG. 6.

Next, fitting procedure of the engaging trench 8 to the flange portion 5 will be described.

Figure 10A:
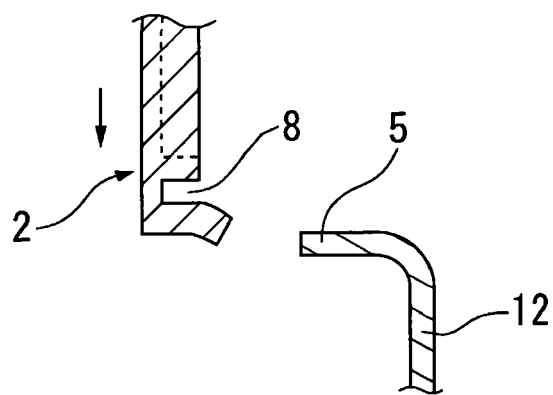
FIG. 10A to FIG. 10D are cross-sectional views showing the steps of attaching a lower portion of the heat shield plate to the support member.
Figure 10B:
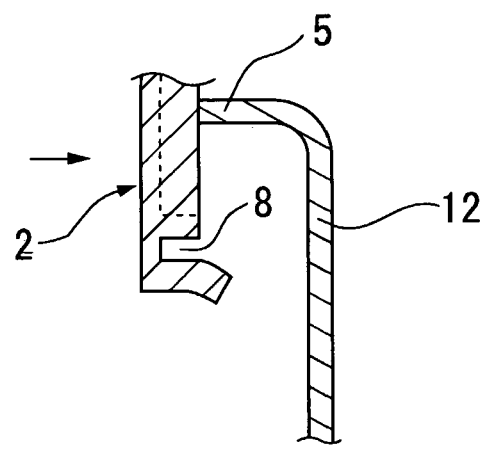
Figure 10C:
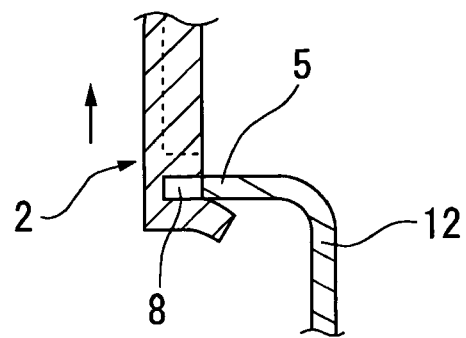
Figure 10D:
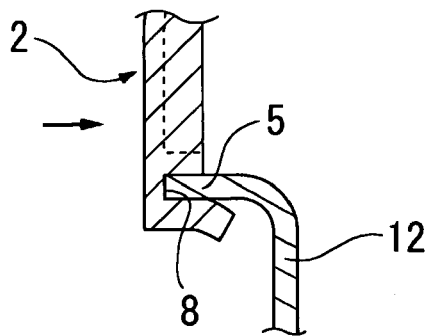

First as shown in FIG. 10A, the heat shield plate 2 is once inserted largely downward between the side radiator core member 14 and the lower radiator core member 12, and then as shown in FIG. 10B, the heat shield plate 2 is moved rearward of the vehicle until the ribs 21 abut the flange portion 5. In this state, as shown in FIG. 10C, the heat shield plate 2 is slid upward, and when the protruding ridge 8b on the lower side abuts the flange portion 5, the lower edge of the heat shield plate 2 is pressed rearward of the vehicle so that, as shown in FIG. 10D, the engaging trench 8 is fitted to the flange portion 5.

In order to attach the upper edge and the inner edge of the heat shield plate 2, the pinch portions 6c for pulling of the respective engaging projections 6 are inserted into the respective engaging holes 7 from the front side of the vehicle of the radiator core support 1, and these pinch portions 6c for pulling are pinched and pulled from the opposite side, vehicle rear side, to pass the large diameter engaging portions 6b through the engaging holes 7, thereby creating a state that the large diameter engaging portions 6b engage with the opening edges of the engaging holes 7 to prevent disengagement thereof. This results in a state that, as shown in FIG. 5 and FIG. 6, the upper edge and the inner edge of the heat shield plate 2 are attached to the upper side radiator core member 15 and to the side radiator core member 14.

The effect of this embodiment will be described.

In this embodiment, since attachment of the heat shield plate 2 can be performed by a simple operation of merely inserting the engaging projections 6 formed integrally on the heat shield plate 2 into the engaging holes 7 and pulling therethrough, the attachment of the heat shield plate 2 can be performed easily and quickly even in a small work space, which improves the work efficiency.

Further, by forming the hollow portion 6d communicating with the outside atmosphere at the axial center of the small diameter axis portion 6a and the large diameter engaging portion 6b of the engaging projection 6, passing of the large diameter engaging portion 6b through the engaging hole 7 becomes easy, and at the same time, engaging strength thereof can be improved.

Further, since the hollow portion 6d is constructed such that it opens on the surface opposite to the projecting direction of the engaging projections 6 on the heat shield plate 2 so that the hollow portion 6d communicates with the outside atmosphere, integral formation of the engaging projection 6 having the hollow portion 6d becomes easy in relation with a shaping die, and also the engaging portion k of the large diameter engaging portion 6b becomes easily to be deformed in a contracting direction, so that the passing of the large diameter engaging portion 6b through the engaging hole 7 can be performed more easily.

In this embodiment, the heat shield plate 2 is constituted of elastic material such as rubber, the flange portion 5 is formed to bend forward of the vehicle on the upper edge of the lower radiator core member 12, the engaging trench 8 opening rearward of the vehicle is formed on the lower edge of the heat shield plate 2, and the engaging trench 8 is constructed to be fitted to and engaged with the flange portion 5 to achieve attachment of the lower edge of the heat shield plate 2. Accordingly, the attachment can be performed by a simple operation of fitting and engaging the engaging trench 8 to and with the flange portion 5. Therefore, attachment of the heat shield plate can be performed easily and quickly even in a small work space, which improves the work efficiency.

Further, since the engaging trench 8 is formed such that the inner wall surface 82 on the lower side thereof is longer toward the rear side of the vehicle than the inner wall surface 81 on the upper side thereof, positioning of the engaging trench 8 with respect to the flange portion 5 can be performed easily.

Further, the taper portion 83 is formed on the opening edge of the inner wall surface 82 on the lower side of the engaging trench 8, so that the fitting of the engaging trench 8 to the flange portion 5 can be performed easily.

Further, the attachment of the heat shield plate 2 does not require any fastening parts such as separate clips, bolts, and the like, so that the cost can be reduced.

The embodiment has been described above, but the present invention is not limited to the above-described embodiment, and any design modification and so on in the range not departing from the spirit of the present invention will be embraced in the present invention.

For example, in the embodiment, an example in which the entire radiator core support 1 is formed of metal is shown, but the present invention can be applied to a radiator core support which is partly or entirely formed of resin.

In this embodiment, the heat shield plate and the engaging projection are integrally formed of elastic material, but the heat shield plate may be formed of different material from the engaging projection formed of elastic material.

The entire contents of Japanese Patent Application No. 2004-204999 filed Jul. 12, 2004 is incorporated herein by reference.

What is claimed is:

1. A heat shield plate attachment structure of a heat exchanger for a vehicle, comprising:
    a heat shield plate attaching portion that is provided on a vehicle body and has an engaging hole formed thereon; and
    a heat shield plate having an engaging projection formed of elastic material thereon so that the engaging projection engages elastically with the engaging hole of said heat shield plate attaching portion, the engaging projection having, from a base side thereof, a small diameter axis portion formed thereon with substantially the same outside diameter as an inside diameter of the engaging hole, a large diameter engaging portion formed in a diameter-shrinking shape having an engaging portion with a larger diameter than the inside diameter of the engaging hole on a tip side of the small diameter axis portion, a pinch portion for pulling formed with a smaller diameter than the inside diameter of the engaging hole on a tip of the large diameter engaging portion, and a hollow portion formed at the axial center of the small diameter axis portion and the large diameter engaging portion, the hollow portion communicating with the outside atmosphere,
    wherein said heat shield plate is attached to said heat shield plate attaching portion in such a manner that the pinch portion is inserted into the engaging hole and pinched and pulled from the opposite side thereof to pass the large diameter engaging portion through the engaging hole so that the large diameter engaging portion engages with the opening edge of the engaging hole, wherein the hollow portion terminates before reaching the pinch portion.

2. The heat shield plate attachment structure of the heat exchanger for the motor vehicle according to claim 1, wherein
    the hollow portion opens on a surface opposite to the projecting direction of the engaging projection on the heat shield plate so that the hollow portion communicates with the outside atmosphere.

3. The heat shield plate attachment structure of the heat exchanger for the motor vehicle according to claim 2, wherein
    said heat shield plate and the engaging projection are integrally formed of the elastic material with each other.

4. The heat shield plate attachment structure of the heat exchanger for the motor vehicle according to claim 1, wherein
    said heat shield plate and the engaging projection are integrally formed of the elastic material with each other.

* * * * *